Patented Dec. 6, 1938

2,139,393

UNITED STATES PATENT OFFICE 2,139,393

PROCESS FOR THE PRODUCTION OF ALKYL ESTER SALTS

Adrianus Johannes van Peski and Anton Johan Tulleners, Amsterdam, Netherlands, assignors to Shell Development Company, San Francisco, Calif., a corporation of Delaware No Drawing. Application June 24, 1935, Serial No. 28,214. In the Netherlands July 3, 1934

9 Claims. (Cl. 260—460)

This invention relates to the production of salts of alkyl esters of polybasic acids and is particularly concerned with the production of such salts from absorption products of olefines in polybasic acids.

Our invention may be practised with any suitable olefine-acid absorption product, regardless of the source or character of the olefine with the exception that tertiary olefines are not within our province due to their ease of autohydrolysis when absorbed by acids. As suitable starting material for the preparation of such absorption products, hydrocarbons derived from mineral oils as petroleum, shale oil, and the like, or from mineral oil products, or from natural gas or from coal, peat and like carboniferous natural materials, may be used, as well as those derived from animal or vegetable oils, fats and waxes. The olefines present in such starting material may be of natural occurrence, the result of a dehydrogenation, distillation, vapor or liquid phase cracking, or other pyrogenetic treatment. The olefines may be used in a pure state, either as individual olefines or pure olefinic mixtures, or in admixture with paraffins or other compounds which may be considered as inert in the absorption process. Furthermore, such olefines may comprise hydrocarbon fractions consisting of, or predominating in, hydrocarbons containing the same number of carbon atoms to the molecule, or of mixtures of non-isomeric hydrocarbons. Ethylene and/or secondary-base olefines (i. e. olefines, both iso and normal, which yield secondary derivatives) as propylene, butene-1, butene-2, $\alpha$ and $\beta$ amylene, isopropyl ethylene, and higher homologues and analogues thereof may thus be used. Tertiary-base olefines (iso-olefines which yield tertiary derivatives) as isobutylene, trimethylethylene, and the like may be present in the olefinic or hydrocarbon mixtures used as raw material, although they are preferably selectively removed prior to the formation of the desired absorption product or acid liquor.

Suitable acids which may be used as absorption media for olefines in the preparation of acid liquors to which our invention is applicable, are polybasic mineral-acting acids of which sulfuric, pyro-sulfuric, phosphoric, pyrophosphoric, and the like are typical. The concentrations in which such acids are customarily used for the absorption of olefines vary widely depending upon the character of the olefine or olefines involved, the olefinic concentration, and the temperature at which the absorption is carried out. In the practice of our invention we preferably adjust the conditions of olefine absorption, in the conventional manner, so that substantially only absorption of the olefines is effected and tar formation, and other undesirable side reactions are reduced to a minimum. The resulting "acid liquor" usually comprises an aqueous solution of neutral and/or acid esters with some free mineral-acting acid and may or may not contain small amounts of polymer, free alcohol and/or very low percentages of free hydrocarbons.

Hitherto such absorption products or acid liquors have been used as starting material for the preparation of alcohols, ethers and esters. We have now found that the acid alkyl esters present in these absorption products may also be used for the production of salts which have many valuable properties and uses.

For the purpose of making our invention more clear it will be described with more particular reference to certain specific embodiments thereof, as applied to the preparation of salts of acid alkyl sulfates, but it will be understood that we are not to be limited thereto, as our invention is capable of many widely different embodiments and may be used to prepare the salts of acid alkyl esters of other polybasic mineral-acting acids.

For purposes of convenience our main invention may be sub-divided into two genera subaltern: one, relating to the treatment of alkyl acid esters and two, relating to the treatment of neutral polyalkyl esters of polybasic mineral-acting acids. A possible third mode of treatment comprises the conversion, more or less simultaneous of both of the above types of esters to the corresponding desired salts. One may operate in the presence or absence of free acid, especially in those cases wherein acid liquor is the raw material to be treated. Where it is prefered first to remove any free acid present in the liquor containing ester or esters to be converted, such free acid may be rendered innocuous either by extraction or neutralization. When a liquor is obtained not containing substantial amounts of free acid, for example as a result of rendering the free acid innocuous as described above, said resulting liquor may be treated with an alkaline agent under such conditions of concentration and temperature that all the alkyl acid ester content and all or substantially all the neutral ester content are converted to the desired salt. Alternatively the conditions may be so controlled that substantially only the acid ester content is converted to the salt or salts, after which the neutral alkyl ester is then converted. Also the liquor, rendered free of free acid, may be first separated into two phases, one of which contains the greater part of the alkyl acid ester content while the other phase contains a greater part of the neutral ester content. As a modification, the above-mentioned stratification may be carried out in such a manner that the alkyl acid ester content is simultaneously converted into the salt while it is being separated.

One simple method of carrying out our invention comprises evaporating an olefine absorption product in the presence of an alkaline agent. The concentration and quantity of the alkaline compound added will vary with the character of the acid liquor. For example, when free acid is present in said acid liquor, sufficient of the alkaline agent should be added to neutralize the free acid and convert substantially all the alkyl acid ester to the desired salt. Or the conditions may be made more severe by operating at higher temperatures with larger excesses of alkaline agent substantially to convert the neutral ester to the corresponding desired salt. When applying this method an easily pumpable mixture is obtained, the high temperature being conducive to the alkaline saponification. No appreciable decomposition of the alkyl acid ester salt can take place at this high temperature, in view of this salt coming into direct contact with the excess of lye. Where sodium salts are desired, NaOH, NaHCO₃, NaOCl, NaCOOCH₃, and in general salts of relatively weak acids, and the like, may be used. Other salts such as potassium, calcium, ammonium, copper, lead, and the like salts may be similarly prepared. By this method of treatment, the final product will contain the corresponding salts of the free acid present in the acid liquor used unless a special purification operation is resorted to after the evaporation. Such purification treatment may, for example, comprise extraction of the evaporated product with a suitable selective solvent for the salts of the acid alkyl esters. For this purpose ether, ethyl alcohol, and the like may be used. Similar purification operations may also be carried out in connection with other modifications of our invention.

It is preferable when using the above method of procedure for the preparation of the desired salt to adhere as strictly as possible to the theoretical requirement of alkaline agent, as either an excess or a deficiency may prove detrimental in the final product. Thus the presence of unsaponified dialkyl sulfates resulting from the use of insufficient alkaline agent may lead to the formation of free alkyl sulfuric acid in the product, which may not only make it difficult to obtain the alkyl sulfate salts in a perfectly dry form, but also may lead to further decomposition, with formation of free sulfuric acid, in subsequent use or storage of the product. The presence of free alkali may also seriously interfere in many of the uses to which these products are particularly adapted.

These difficulties may be avoided in several ways without recourse to exacting chemical control. The danger from excess alkali may be eliminated, for example, by salting out or extraction by means of a compound of the metal from which it is desired to prepare the alkyl sulfate salt. Thus to prepare the sodium salt, for example, the absorption product may be extracted with a solution of a basic sodium compound such as sodium bicarbonate, sodium hydroxide and the like. The sodium salts of the alkyl sulfuric acid esters formed may then be removed from the extract by salting out with sodium chloride and the like.

In every case operating as well as economic advantages result from the removal of free acid from the olefine absorption product prior to formation of the desired salt. This may be effected in several ways. Advantage may be taken of the process described in copending application, Serial No. 27,048 filed June 17, 1935 by Tulleners, whereby the acid is selectively removed in a free state by extraction with a small quantity of water, for example. Besides the absence of sulfate in the final product, this procedure also provides the possibility of economic regeneration of the excess acid. Furthermore, the coloring constituents present in the absorption product are removed in the aqueous layer simultaneously with the free acid with the result that a finished product of much improved appearance is obtained.

Alternatively, the free acid present in the olefine absorption product may be removed by selective neutralization, as by treatment with an alkaline agent such as Glauber's salt, preferably after the addition of water or ice. The sodium bisulfate formed separates as an aqueous layer which may be drawn off from the layer containing the alkyl esters. This procedure prevents the final product being adulterated with sulfate to any appreciable extent.

The separation of the phases in this method of procedure may be facilitated by the addition of a small quantity of a substance which alters the interfacial tension such as ethyl ether, amyl alcohol, and the like.

To insure the absence of neutral alkyl esters in the finished product several alternative procedures may be employed. For example, the solution containing neutral alkyl esters and salts of acid alkyl esters may be extracted with suitable selective solvents for the former such as benzene, gasoline fractions, saturated hydrocarbons as pentane, hexane, etc., their admixtures, and the like. This extraction may be carried out in either the presence or absence of free acid. Another effective method of procedure comprises dilution of the, preferably acid-free, olefine absorption product with a relatively large amount of water whereby two phases will be formed. The phase containing the neutral esters and any polymers present may be drawn off and the aqueous phase containing substantially only acid alkyl esters may then be used to prepare the desired salt by any of the described methods. This separation of phases can conveniently be effected by dilution with a solution of a basic compound of the metal from which the alkyl ester salt is to be prepared. In this manner reaction as well as solution takes place, so two phases are formed with one phase containing a solution of a metallo alkyl ester. In these ways of operating, the product is freed of the polymers which accumulate in the phase with the neutral alkyl esters.

The neutral alkyl esters, so separated from the olefine absorption product, may be converted into alkyl ester salts by treatment with an alkaline agent at an elevated temperature. This procedure offers special advantages wherever it may be more desirable to make use of the acid alkyl esters for the preparation of other products such as alcohols, and the like. When it is not so desired to prepare a different product or products from the acid alkyl esters the conversion of the neutral esters into alkyl ester salts may advantageously be effected without separation of the two types of esters. Thus the olefine absorption product, preferably after being freed of its excess acid, if present, may be treated with a solution of a basic compound of the metal from which the alkyl ester salt is to be prepared. The base is added in sufficient amount to effect decomposition of the neutral alkyl esters present and the mixture is heated until their decomposition is substantially complete. The recovery and purification of the alkyl ester salts formed from both neutral and acid alkyl esters may then be carried out in any of the ways which have been described. By this method of operation, not only is an injurious component (neutral esters) of the final product eliminated, but also the yield of the desired alkyl acid salt is increased.

The following examples illustrate specific applications of our invention to the production of sodium salts of alkyl sulfuric acid esters, but the same procedures may be used to prepare any other desired salt and/or salts of other alkyl acid esters.

Example I

An absorption product was prepared from 15 kgs. of vapor phase cracked gasoline fraction with a boiling temperature range of 53° to 68° C. and 40.4 kgs. of 90% sulfuric acid solution. The sulfuric acid was added to the hydrocarbon fraction in small amounts while care was taken that the temperature of the mixture did not exceed about 0° to 5° C. The reaction required about three hours for completion. After being stirred another half hour at about 8° to 10° C. the absorption product was poured into about 80 kgs. of saturated sodium sulfate solution and cooled to about 0° C.

Two phases were formed which were extracted with about 30 kgs. of ether. After extraction and removal of the ether extract the mixture was allowed to stratify and the lower aqueous phase containing principally sodium bisulfate drawn off. This solution was again extracted with about 10 kgs. of ether.

The ether extracts containing both acid and neutral alkyl esters of sulfuric acid and polymers, were combined and treated with a saturated sodium bicarbonate solution until an alkaline reaction was obtained. By this treatment two phases were again formed. These were allowed to stratify and were separated. The upper ether layer containing principally neutral esters and polymers was again extracted twice with a saturated sodium bicarbonate solution. The aqueous lower layers which contained the alkyl sodium sulfates formed were combined and extracted twice with 10 kgs. of benzine to remove any neutral product which might still be present. After separation of the benzine extract, the remaining aqueous solution was evaporated to dryness.

The dry residue was treated with cold alcohol whereby the sodium alkyl sulfates were dissolved. The resulting alcoholic solution was filtered to remove any insoluble inorganic salts present and the filtrate freed of alcohol by evaporation. 23.5 kgs. of sodium alkyl sulfates were obtained as a light yellow solid.

Example II 12.7 kgs. of 90% sulfuric acid were added to 20 kgs. of a cracked benzine fraction of boiling temperature range of about 160° to 220° C. The benzine fraction was obtained by vapor phase cracking of paraffin cakes and had a bromine value, according to McIlhinney, of 94. The acid addition was carried out slowly while thoroughly cooling and stirring the mixture for about one and a half hours so that a temperature of about 5° to 10° C. was maintained therein.

The absorption product obtained was poured on to 3.3 kgs. of ice which caused the temperature to rise to about 25° C. After standing about fifteen minutes a division into two layers took place in the mixture. These layers were separated. The lower layer was found to be about a 62% sulfuric acid solution containing much of the coloring matter which had been present in the absorption product.

The upper layer was neutralized with a 40% sodium hydroxide solution of which about 3.14 liters were required. Any excessive rise in temperature during neutralization was avoided by cooling. The dialkyl sulfate content of the neutral product was determined by analysis and it was found that 1.6 liters of the 40% sodium hydroxide solution would be required to effect its saponification. This amount of alkali was then added and the solution was heated to a temperature of about 95° C. and maintained at that temperature for about three hours. The product of the reaction was diluted with about 20 liters of water and again heated at 95° C. for some time. Two phases were formed in this operation. After heating these phases were allowed to stratify and the upper phase (3.12 kgs.) comprising products of polymerization, alcohols, etc. was separated from the lower layer which was a clear solution of sodium alkyl sulfates. This solution could be further diluted with water without becoming cloudy and on evaporation under vacuum yielded 19 kgs. of air-dried product.

Example III

A crack distillate fraction boiling between 220° and 300° C. obtained by cracking crude paraffin cakes in the vapour phase at 560° C., substantially containing alkenes with 13 to 18 C-atoms, with a bromine number McIlhinney=50.5, corresponding to a percentage of alkenes of approximately 68, and a molecular quantity of 90% sulfuric acid, are intensively mixed in a reaction vessel. The reaction vessel is kept at a temperature of 25° C. by cooling, the time of reaction being about 1 hour. After this about 10% by weight of water is added to the mixture, whilst the temperature is kept at 25° C. The mixture is then introduced into a separator, in which two layers are formed, the lower consisting of an approx. 56% $H_2SO_4$ solution and the upper layer of acid and neutral alkyl sulfates, polymerization products and unconverted base material. The said upper layer is introduced, simultaneously with an excess of lye, while intensively stirring, into a reaction vessel, which is kept at about 100° C. The time of reaction is about 6 hours. In the reaction vessel the neutralization of the alkyl acid ester as well as the saponification of the neutral alkyl ester takes place. Care is taken that an alkaline reaction prevails throughout the reaction vessel, the final product yet showing as slight an alkaline character as possible. The alkyl acid ester salt in an alkaline medium being resistant against heating, there is no risk of a decomposition of this salt. The reaction mixture obtained is mixed with an equal quantity of water and introduced into a separator, where the mixture is separated into an upper layer insoluble in water and an aqueous solution of sodium alkyl sulfate. The separator is thereby likewise kept at 100° C. The sodium alkyl sulfate may be obtained as a dry powder, e. g. by using a spraying and drying apparatus. The yield of sodium alkyl sulfate, calculated on the quantity of olefines present in the initial material, amounts to about 59% of the theoretical yield. The process is carried out continuously.

The salts of the alkyl esters of polybasic mineral-acting acids which may be prepared by our invention may be used, individually or as mixtures, with or without other agents, for a great many widely different purposes. They have exceptional wetting and emulsifying power. They may be used for the production of preparations for treating textiles, for greasing leather, as leveling agents in the dyeing of materials of all kind, as flotation agents, in the preparation of finely divided pigments, spray oils, aqueous dispersions of water-insoluble substances like paraffin, tar, asphalt, etc., and the like. They may also serve as intermediates in the synthesis of other valuable organic compounds such as alkyl cyanides, thio-ethers, etc. When reacted with salts of fatty acids they furnish esters and may also be used for the preparation of pure alcohols. For the latter purpose they may be dissolved, for example, in water, and yield alcohols after acidification and heating.

While we have in the foregoing described in some detail the preferred embodiments of our invention and some variants thereof, it will be understood that this is only for the purpose of making the invention more clear and that the invention is not to be regarded as limited to the details of operation described, nor is it dependent upon the soundness or accuracy of the theories which we have advanced as to the advantageous results attained. On the other hand, the invention is to be regarded as limited only by the terms of the accompanying claims, in which it is our intention to claim all novelty inherent therein as broadly as is possible in view of the prior art.

We claim as our invention:

1. In a process for the production of alkyl ester salts from acid liquor produced by the absorption of an olefine in a polybasic mineral acid, the steps of substantially removing free acid from the acid liquor, substantially removing alkyl acid esters from the neutral alkyl ester content and saponifying the latter by reaction at an elevated temperature not substantially higher than 100° C. with a strong aqueous solution of a strong inorganic base for a time insufficient to form more than one mol of alcohol per mol of neutral ester to form directly the corresponding alkyl ester salt.

2. In a process for the production of alkyl ester salts from acid liquor produced by the absorption of an olefine in a polybasic mineral acid, the steps of substantially separating the neutral alkyl ester content therefrom and heating the separated neutral alkyl ester with a stoichiometric excess of aqueous alkali of at least 40% concentration to saponification temperature not substantially higher than 100° C. for a time insufficient to form more than one mol of alcohol per mol of neutral ester to form directly the corresponding alkyl ester salt.

3. In a process for the production of alkyl ester salts from acid liquor produced by the absorption of an olefine in a polybasic mineral acid, the steps of rendering innocuous substantially all the free acid therein and subsequently adding sufficient of an aqueous solution of an inorganic alkaline agent to the resulting product to form two phases therein one of said phases containing the major neutral alkyl ester content of the acid liquor.

4. In a process for the preparation of alkyl ester salts from acid liquor produced by the absorption of an olefine in a polybasic mineral acid, the steps of substantially freeing the alkyl acid ester content from the unreacted neutral alkyl ester content by extraction with an inorganic alkaline solution and recovering alkyl ester salt present in the extract.

5. In a process for the preparation of alkyl ester salts from acid liquor produced by the absorption of an olefine in a polybasic mineral acid, the steps of substantially freeing the alkyl acid ester content from the unreacted neutral alkyl ester content by extraction with an alkaline solution and separating salt corresponding to said alkyl acid ester from the extract by salting it out.

6. In a process for the preparation of alkyl ester salts from acid liquor produced by the absorption of an olefine in a polybasic mineral acid, the steps of substantially freeing the alkyl acid ester content from the unreacted neutral alkyl ester content without substantial decomposition of the latter by extraction with an inorganic alkaline solution and separating the salt corresponding to said alkyl acid ester from the extract by evaporation.

7. A process for producing alkyl ester salts which comprises extracting an acid-free absorption product of an olefine in a polybasic mineral acid with sufficient aqueous solution of an inorganic basic agent to cause the separation of an aqueous phase therefrom containing substantially only the acid ester content, removing said aqueous phase from the remainder of the absorption product and recovering alkyl ester salts from said aqueous phase.

8. A process for producing alkyl ester salts which comprises extracting an acid-free absorption product of an olefine in a polybasic mineral acid with an aqueous solution of an inorganic basic agent, heating the extracted phase in the presence of sufficient inorganic basic agent to saponify the neutral alkyl ester present therein, diluting the resulting reacted mixture with sufficient water to cause separation of an aqueous phase containing the acid alkyl ester salts produced and a non-aqueous phase containing polymer material and alcohol formed by saponification of the neutral alkyl ester and separating said alkyl ester salts from the separated aqueous phase.

9. In a process for the production of alkyl ester salts from acid liquor produced by the absorption of an olefine in a polybasic mineral acid, the steps of substantially removing free acid from the acid liquor, substantially removing alkyl acid esters from the neutral alkyl ester content and saponifying the latter by reaction with a strong aqueous solution of a strong inorganic base at a temperature above 20° C. but below the boiling point of water under the operating conditions for a time insufficient to form more than one mol of alcohol per mol of neutral ester to form directly the corresponding alkyl ester salt.

ADRIANUS JOHANNES VAN PESKI.
ANTON JOHAN TULLENERS.